Figure 1:
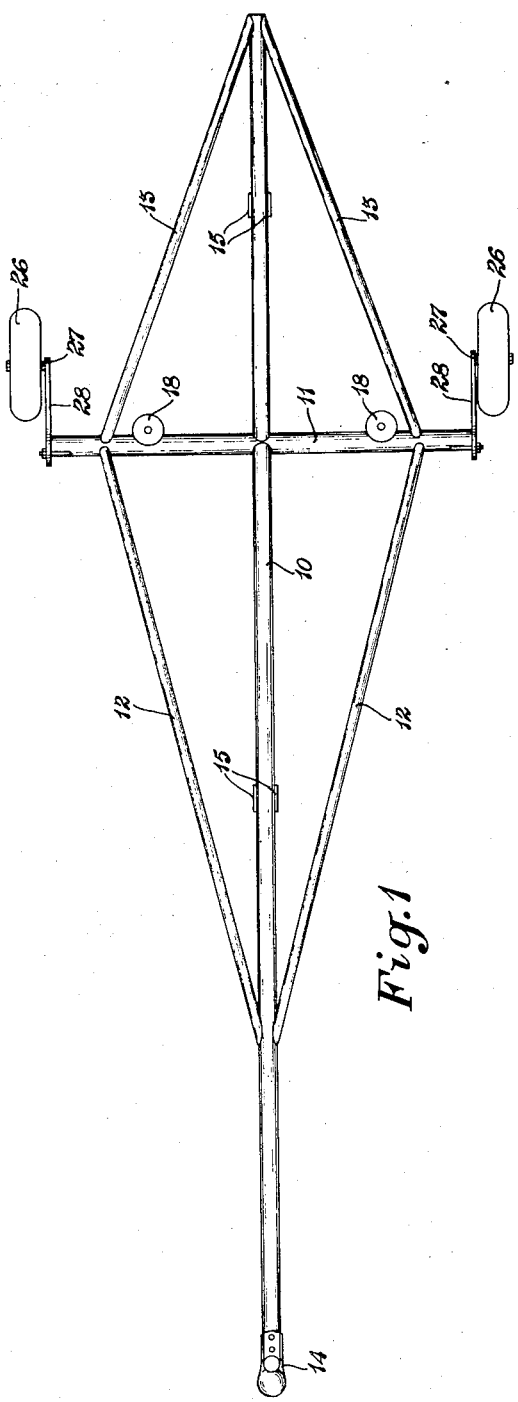

Feb. 14, 1950 — A. B. COOPER — 2,497,072
TORSION SPRING WHEEL SUSPENSION

Filed June 14, 1947 — 2 Sheets-Sheet 1

Inventor
*Arthur B. Cooper*
By *Frease and Bishop* Attorneys

Feb. 14, 1950  A. B. COOPER  2,497,072
TORSION SPRING WHEEL SUSPENSION
Filed June 14, 1947  2 Sheets-Sheet 2
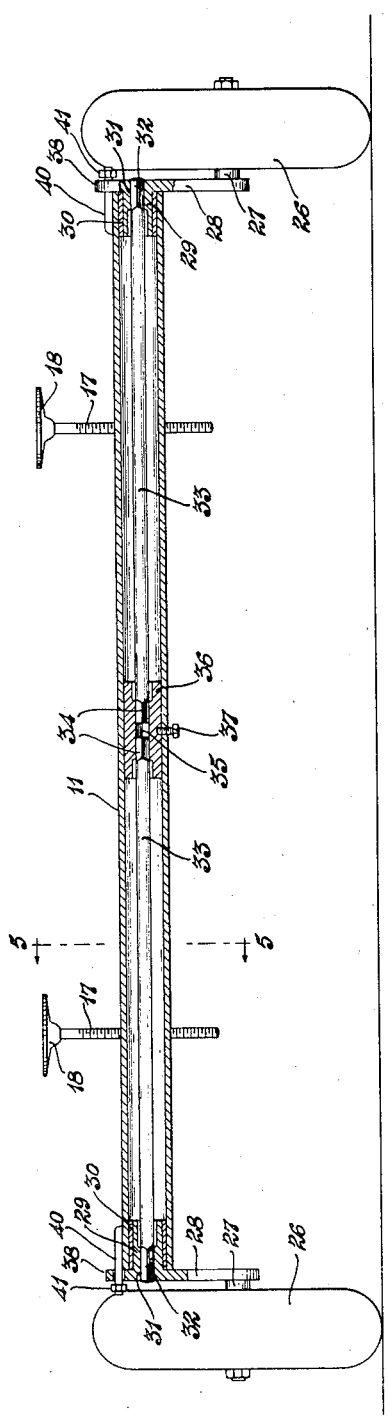
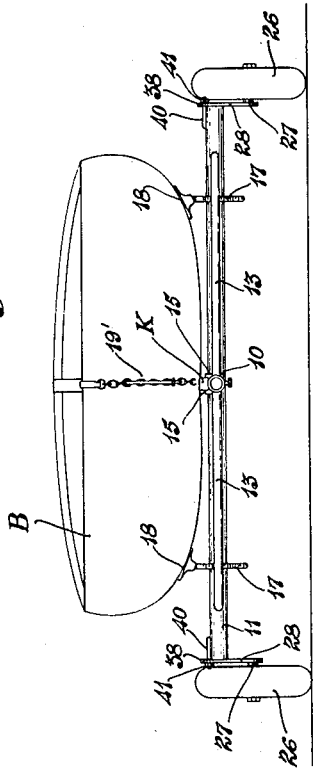
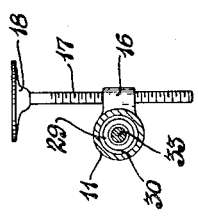
Inventor
Arthur B. Cooper
By
Frease and Bishop Attorneys Patented Feb. 14, 1950

2,497,072

UNITED STATES PATENT OFFICE 2,497,072

TORSION SPRING WHEEL SUSPENSION

Arthur B. Cooper, Massillon, Ohio

Application June 14, 1947, Serial No. 754,699

5 Claims. (Cl. 280—124)

The invention relates to trailers especially adapted for transporting boats over a highway, and more particularly to a torsion spring suspension vehicle of this character.

An object of the invention is to provide a boat trailer in the form of a two wheeled vehicle constructed so that it will completely support a boat, during the transportation thereof, in a manner which will prevent injury to the boat.

Another object is to provide a trailer of this character in which the entire length of the keel of the boat is supported upon the trailer.

A further object is to provide such a trailer which is light in weight, simple and inexpensive in construction and strong and durable in use.

A still further object is to provide a boat trailer having a tubular body frame comprising a longitudinal keel supporting member, a transverse spring housing member, and four angular brace members connected to the end portions of the longitudinal and transverse members in substantially diamond shape.

Another object is to provide such a trailer in which the keel of the boat rests upon the longitudinal member, means being provided for securing the bow and stern of the boat to opposite end portions of the longitudinal member, and adjustable means with swivelled heads being mounted upon the transverse member for contact with the bottom of the boat to hold the boat in upright position upon the trailer.

A further object of the invention is to provide a trailer of the character referred to in which the road wheels of the trailer are journalled upon torque arms swingingly mounted in the plane of travel and acted upon by torsion spring bars located within the transverse spring housing member of the trailer body frame.

A still further object is to provide such a construction of trailer in which the torsion spring bars serve not only as spring members but also as supporting means for the wheel carrying torque arms.

It is also an object of the invention to provide such a trailer in which the torsion bars are housed in the transverse tubular member which serve to provide an abutment for the torsion bars and also a journal for the wheel carrying torque arms.

Another object of the invention is to provide such a construction in which each wheel supporting lever or torque arm is individually engaged with a separate torsion bar or rod whereby either torque arm may be removed without disturbing the other.

Still another object is to provide such a construction in which in the event that either torsion bar breaks it will not affect the other torque arm or wheel.

A further object is to provide such a torsion spring construction in which means is provided for independently limiting the upward or backward swinging movement of each torque arm so that in the event of a torsion bar breaking the trailer may still travel safely upon the highway and the body frame thereof will be held out of contact with the road.

A still further object of the invention is to provide a trailer with such a torsion spring construction in which means is provided for preventing each torque arm from becoming disengaged from the transverse tubular housing member in the event of breakage of the corresponding torsion bar.

Another object is to provide a torsion spring construction of the character referred to in which each torsion bar has squared outer ends received in squared openings in journal portions upon the torque arms which are journalled within the ends of the tubular housing, each torque arm having an ear at its upper or forward end provided with an arcuate slot, a bolt being fixed upon the adjacent end of the tubular housing member and located through said arcuate slot to limit the swinging movement of the torque arm and prevent the torque arm from becoming detached from the tubular housing in the event of breaking of the torsion arm.

Figure 2:
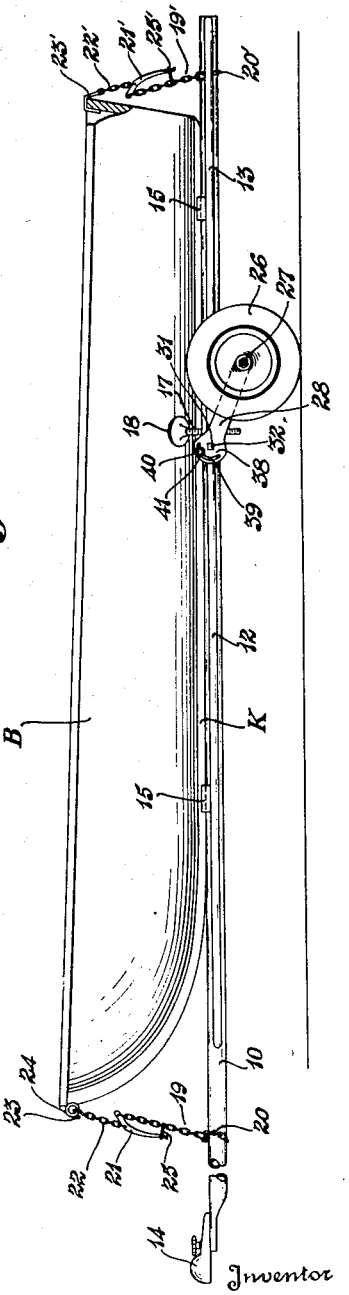

The above objects together with others which will be apparent from the drawings and following description, or which may be later referred to, may be attained by constructing the improved boat trailer with torsion spring suspension means in the manner hereinafter described in detail and illustrated in the accompanying drawings, in which:

Figure 1 is a top plan view of a boat trailer constructed in accordance with the invention;

Fig. 2 a side elevation of the boat trailer shown in Fig. 1 showing the manner of supporting a boat thereon;

Fig. 3 a rear end elevation of the trailer with the boat mounted thereon;

Fig. 4 an enlarged transverse sectional view through the tubular spring housing member showing the torsion spring construction; and, Fig. 5 a section taken on the line 5—5, Fig. 4 showing one of the adjusting screws with swivelled heads for contact with the bottom of the boat.

The body frame of the trailer is preferably formed of tubular members comprising the central longitudinal member 10, the transverse spring housing member 11, preferably of greater diameter and connected to the longitudinal member at a point spaced from its rear end, and the tubular brace members 12 and 13 particularly of relatively small diameter.

The brace members 12 are connected at their rear ends to the transverse member 11 near opposite ends thereof and at their forward ends to the longitudinal member 10, at a point spaced from its forward end, and the brace members 13 are connected at their forward ends to the transverse member 11, adjacent to the point of connection thereto of the brace members 12 and at their rear ends to the rear end of the longitudinal member 10 producing a substantially diamond shaped frame. The several tubular members are preferably connected together by welding.

The socket member 14 of a conventional ball and socket trailer hitch may be connected to the forward end of the longitudinal frame member 10 for engagement with the ball member of the trailer hitch which may be attached to the rear portion of the draft vehicle. Spaced pairs of upstanding lugs 15 are provided upon the longitudinal frame member 10 for a purpose to be later explained.

An internally threaded boss 16 is formed upon, or rigidly connected to the transverse tubular member 11, at a point spaced on each side of the center thereof, to receive the adjusting screws 17 having the swivelled heads 18 thereon arranged to be tilted in any direction relative to the screws 17.

In mounting a boat, as indicated generally at B in Figs. 2 and 3, upon the trailer, the boat is centrally located upon the trailer with the bow thereof toward the front of the trailer, the entire length of the keel K of the boat resting upon the longitudinal frame member 10 and received between the lugs 15 thereon so as to hold the boat against transverse movement relative to the trailer frame.

The adjusting screws 17 are adjusted so that the swivelled heads 18 thereon will contact the bottom of the boat at points spaced from each side of the keel in order to hold the boat in upright position.

For the purpose of securing the boat to the frame of the trailer so that it may be safely transported thereon, means is provided for securing the bow and stern of the boat to the front and rear end portions respectively of the longitudinal frame member 10. Such means is best shown in Fig. 2 and may comprise chains with clamping hooks thereon as shown.

For securing the bow of the boat to the trailer frame, the chain 19 may have its lower end attached to the forward end portion of the longitudinal frame member 10 as indicated at 20, the upper end of this chain being connected to one end of the clamping hook 21 to which the section of chain 22 is connected at a point spaced from the same end of the hook, the chain 22 having a hook 23 at its upper end for engagement with the usual eye 24 ordinarily provided at the bow of a boat. A ring 25 is carried by the chain 19 for engagement with the other end of the clamping hook 21 when the hook has been swung to the clamped position shown in Fig. 2.

A similar device may be provided for securing the stern of the boat to the frame of the trailer and comprises the chain 19' which may have its lower end secured to the longitudinal frame member 10 as indicated at 20', the upper end thereof being attached to one end of the clamping hook 21', a short section of chain 22' being connected to the said clamping hook at a point spaced from said end and having at its upper end a hook or clamp 23' adapted to engage over the transom of the stern of the boat. A ring 25' may be provided upon the chain 19' for holding the clamping hook 21' in locked position.

The road wheels of the trailer, indicated generally at 26, are journalled upon the axles 27, mounted upon the lower or rear ends of the torque arms 28. An angular journal boss 29 is formed upon each torque arm 28 near the upper or forward end thereof and is journalled within the adjacent end of the transverse spring housing member 11, a bronze or brass bushing 30 being preferably located within each end of the tubular member 11 for this purpose.

Each of the journal bosses 29 has a square central opening 31 to receive the square outer end 32 of the corresponding spring torsion bar 33. The inner ends of the torsion bars are squared, as indicated at 34, and are received in the square central opening 35 in the block 36 which is rigidly mounted within the center of the tubular member 11 and held against movement by any well known means such as the set screw 37.

The torsion bars 33 are formed of alloy steel and provide a spring suspension means for the trailer frame upon the wheels 26. When weight is placed upon the trailer, with the wheels upon the ground the torque arms 28 will be swung upward and backward twisting the torsion bars 33 around their axes.

In order to prevent the torque arms from becoming disengaged from the tubular housing 11 and torsion bars 33, as well as to limit the swinging movement of the torque arms, an ear or extension 38 is formed upon the upper or forward end of each torque arm and provided with an arcuate slot 39 which receives the outer end of a bolt 40, welded or otherwise rigidly connected to the adjacent end of the tubular housing 11 and extending beyond the same, a shoulder, preferably in the form of a nut 41 being mounted upon each bolt for retaining the torque arm assembled to the tubular housing 11 and torsion bar 33.

In the event one of the torsion bars 33 should break while the trailer is being used to transport a boat, it will be seen that the arcuate slot 39 and bolt 40 will limit the upward and rearward swinging movement of the torque arm 28 so that while this side of the trailer will be lowered below the other side, the trailer frame will not be dropped sufficiently to contact the ground.

In order to replace either of the torsion bars it is only necessary to remove the nut 41 from the corresponding bolt 40 when the journal portion 29 of the torque arm may be withdrawn from the end of the tubular housing 11 so that the corresponding torsion bar may be removed and replaced with a new torsion bar after which the torque arm may be replaced and held in position with the nut 41 in the manner above described.

From the above it will be apparent that a strong, light weight trailer is provided for transporting boats, the entire length of the keel of the boat being supported upon the longitudinal frame member 10 and prevented from transverse movement thereon by means of the lugs 15, the boat being held in upright position by means of the adjusting screws 17 and swivelled heads 18, the bow and the stern of the boat being secured to the frame of the trailer by the chains and locking hooks above described.

It will also be evident that a simple and effective spring suspension means is provided for suspending the trailer frame upon the road wheels with means for preventing the trailer frame from dropping to the ground in the event of breakage of one of the torsion bars, and the spring suspension construction permits quickly and easily replacing a broken torsion bar.

I claim:

1. In a vehicle, a frame, a transverse tubular member in the frame, torsion bar means within the tubular member, means within the tubular member for holding said torsion bar means against rotation, road wheels, axles therefor, a torque arm carrying each axle, the axle being attached to the torque arm on one side of the torsion bar means said torque arms being journalled relative to the tubular member, each torque arm engaging one end of the torsion bar means, an arcuate slot in each torque arm on the end thereof which is on the opposite side of the torsion bar, said slot being concentric with the torsion bar means and a stud rigidly connected to each end of the tubular member and located through said arcuate slot to limit the swinging movement of the torque arms relative to the tubular member, and a shoulder upon each stud for retaining the journal boss in the tubular member and for holding the torque arms against substantial transverse movement.

2. In a vehicle, a frame, a transverse tubular member in the frame, torsion bar means within the tubular member, means within the tubular member for holding said torsion bar means against rotation, road wheels, axles therefor, a torque arm carrying each axle, the axle being attached to the torque arm on one side of the torsion bar means said torque arms being journalled relative to the tubular member, each torque arm engaging one end of the torsion bar means, an arcuate slot in each torque arm on the end thereof which is on the opposite side of the torsion bar, said slot being concentric with the torsion bar means and a bolt rigidly connected to each end of the tubular member and located through said arcuate slot to limit the swinging movement of the torque arms relative to the tubular member, and a nut upon each bolt for retaining the journal boss in the tubular member and for holding the torque arms against substantial transverse movement.

3. In a vehicle, a frame, a transverse tubular member in the frame, a block fixed within the central portion of the tubular member and having a square longitudinal opening therethrough, torsion bars located in each end portion of the tubular member, both ends of each torsion bar being square, the inner square ends of the torsion bars being located in the square opening in said block, torque arms having journal bosses journalled in the ends of the tubular member, said journal bosses having square openings therein receiving the square outer ends of the torsion bars, axles attached to the torque arms on one side of the journal bosses an ear upon each torque arm on the end thereof which is on the opposite side of the journal boss, said ear having an arcuate slot therein concentric with the torsion bar, a stud fixed upon each end of the tubular member and located through the adjacent arcuate slot to limit the swinging movement of the torque arms relative to the tubular member, and a shoulder upon each stud for retaining the journal boss in the tubular member and for holding the torque arms against substantial transverse movement.

4. In a vehicle, a frame, a transverse tubular member in the frame, a block fixed within the central portion of the tubular member and having a square longitudinal opening therethrough, torsion bars located in each end portion of the tubular member, both ends of each torsion bar being square, the inner square ends of the torsion bars being located in the square opening in said block, torque arms having journal bosses journalled in the ends of the tubular member, said journal bosses having square openings therein receiving the square outer ends of the torsion bars, axles attached to the torque arms on one side of the journal bosses an ear upon each torque arm on the end thereof which is on the opposite side of the journal boss, said ear having an arcuate slot therein concentric with the torsion bar, a bolt fixed upon each end of the tubular member and located through the adjacent arcuate slot to limit the swinging movement of the torque arms relative to the tubular member, and a nut upon the bolt for retaining the journal boss in the tubular member and for holding the torque arms against substantial transverse movement.

5. In a vehicle, a frame, a transverse member in the frame, a block fixed to the central portion of the transverse member and having a square, longitudinal opening therethrough, torsion bars having square ends, the inner square ends of the torsion bars being located in the square opening in said block, a tubular bearing fixed to each end of the transverse frame member, the outer square ends of the torsion bars being located through said tubular bearings, torque arms having journal bosses journalled in said tubular bearings, said journal bosses having square openings therein receiving the square outer ends of the torsion bars, axles attached to the torque arms on one side of the journal bosses an ear upon each torque arm on the end thereof which is on the opposite side of the journal boss, said ear having an arcuate slot therein concentric with the torsion bar, a stud fixed upon each of the tubular bearings and located through the adjacent arcuate slot and a shoulder upon each stud for retaining the journal boss in the tubular bearing and holding the torque arms against substantial transverse movement.

ARTHUR B. COOPER.

REFERENCES CITED

The following references are of record in the file of this patent:

UNITED STATES PATENTS

| Number | Name | Date |
|---|---|---|
| 819,302 | Munsing | May 1, 1906 |
| 2,060,015 | Barnes et al. | Nov. 10, 1936 |
| 2,174,063 | Richards | Sept. 26, 1939 |
| 2,175,562 | Frohlich | Oct. 10, 1939 |
| 2,179,410 | Johnson | Nov. 7, 1939 |
| 2,226,047 | Borgward | Dec. 24, 1940 |
| 2,290,620 | Brown | July 21, 1942 |
| 2,295,084 | Keehn | Sept. 8, 1942 |
| 2,299,900 | Jackson | Oct. 27, 1942 |
| 2,375,754 | Ballinger | May 15, 1945 |